United States Patent
Hijikata

(12) 
(10) Patent No.: US 9,233,605 B2
(45) Date of Patent: Jan. 12, 2016

(54) VARIABLE DUCT APPARATUS FOR VEHICLE

(71) Applicant: Fuji Jukogyo Kabushiki Kaisha, Tokyo (JP)

(72) Inventor: Kenji Hijikata, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 14/226,724

(22) Filed: Mar. 26, 2014

(65) Prior Publication Data

US 2014/0295749 A1    Oct. 2, 2014

(30) Foreign Application Priority Data

Mar. 28, 2013    (JP) ................................. 2013-067936

(51) Int. Cl.
 *F01P 1/08*    (2006.01)
 *B60K 11/08*    (2006.01)

(52) U.S. Cl.
 CPC ........... *B60K 11/085* (2013.01); *F01P 2031/00* (2013.01)

(58) Field of Classification Search
 CPC ................. B60H 2001/00092; B60H 1/00671; B60H 1/00678; B60H 1/00871; B60H 1/3421; B60K 11/085; F01P 1/08; F01P 2031/00; F24F 13/15
 USPC ......... 454/107, 108, 143, 145, 152, 153, 155, 454/162, 254, 256, 277, 278, 284, 285, 299, 454/303, 309, 314, 335
 See application file for complete search history.

(56) References Cited

U.S. PATENT DOCUMENTS

| | | | | |
|---|---|---|---|---|
| 2010/0243352 | A1* | 9/2010 | Watanabe | B60K 11/085 180/68.1 |
| 2011/0097984 | A1* | 4/2011 | Hasegawa | B60K 11/085 454/152 |
| 2012/0312611 | A1* | 12/2012 | Van Buren | B60K 11/085 180/68.1 |
| 2013/0146375 | A1* | 6/2013 | Lee | B60K 11/085 180/68.1 |
| 2013/0223980 | A1* | 8/2013 | Pastrick | F01D 5/00 415/1 |
| 2013/0268164 | A1* | 10/2013 | Sugiyama | B60K 11/085 701/49 |

FOREIGN PATENT DOCUMENTS

| | | |
|---|---|---|
| JP | 2010-247819 | 11/2010 |
| JP | 2012-025175 | 2/2012 |
| JP | 2012-197001 | 10/2012 |

* cited by examiner

*Primary Examiner* — Gregory Huson
*Assistant Examiner* — Dana Tighe
(74) *Attorney, Agent, or Firm* — McGinn IP Law Group, PLLC

(57) ABSTRACT

A variable duct apparatus for a vehicle including first and second louvers to rotate around first and second axes to open and closed positions, the variable duct apparatus including: a link to connect first and second louvers; first and second stoppers disposed at the first and second louvers to control the first and second louvers at an open position; a motor to rotate the first louver; and a control device to perform an opening or closing operation for rotating the first louver to the open or closed position by supplying current to the electric motor until a lock current is detected. The control device includes an abnormality determining unit to determine that an operating state is abnormal when an operating angle of the first louver from a start of the opening or closing operation until detection of the lock current is out of a predetermined reference operating angle range.

4 Claims, 8 Drawing Sheets

VARIABLE DUCT APPARATUS FOR VEHICLE

CROSS-REFERENCE TO RELATED APPLICATIONS

The present application claims priority from Japanese Patent Application No. 2013-067936 filed on Mar. 28, 2013, the entire contents of which are hereby incorporated by reference.

BACKGROUND

1. Technical Field

The present invention relates to a variable duct apparatus for a vehicle disposed at the front of the vehicle to adjust the amount of air to be introduced into the front of the vehicle.

2. Related Art

In general, the bumper and/or the front grille which are disposed at the front of a vehicle have an open air grille for introducing air into the front face of a radiator disposed at the front of the vehicle. The air introduced through the air grille cools coolant in the radiator.

During high speed running, running resistance increases as the amount of air introduced into the front of the vehicle through the open air grille of the bumper and/or the front grille increases, whereby fuel efficiency may be reduced. The engine may be excessively cooled in the winter or in a cold region or during continuous high speed running. In addition, the warm-up performance of the engine and the catalytic activity of an exhaust gas purifier device may be affected in the winter or in a cold region.

As a solution to these concerns, a variable duct apparatus has been proposed which is disposed between the bumper and the radiator to adjust the amount of air introduced into the front of the vehicle according to a vehicle speed and a temperature change of the engine coolant.

As an example of a variable duct apparatus, in Japanese Unexamined Patent Application Publication (JP-A) No. 2010-247819 discloses a shutter device. The shutter device in JP-A No. 2010-247819 includes multiple movable fins and an electric motor. The multiple movable fins are arranged at intervals in the vertical direction in an air flow passage formed of a case frame. The electric motor integrally rotates the movable fins around respective axes. The movable fins has a defined operational range which is between an open position and a closed position, the open position allowing air to be introduced into the front of the vehicle, the closed position causing the introduction of air to be blocked or reduced. From a side of the case frame, a prevention unit projects which prevents an operation that causes all the movable fins to exceed the defined operational range, by contact of a single movable fin.

The electric motor is energized for a predetermined time so as to rotate the movable fins from the open position to the closed position or from the closed position to the open position.

An operating time, which is from the start of energization of the electric motor until a lock current value is detected, is measured, the lock current being caused by prevention of a rotational operation of the movable fins, and an abnormal operation of the movable fins is determined based on whether or not the measured operating time is out of the reference time range.

For another example, JP-A No. 2012-25175 disclose a variable shutter device that includes multiple shutters and a slide link. The shutters are fixed to a shutter base and have plate vanes rotatably attached to multiple shafts. The slide link connects the plate vanes. The shutter base is provided with upper and lower stoppers which control the movement of the slide link at an open position and a closed position, respectively. In addition, a return spring is disposed between the upper part of the slide link and the shutter base in a stretched manner so as to urge the plate vanes in a blocking direction. The slide link is connected to an arm link which is rotated by the electric motor.

When power supply to the electric motor is stopped, the slide link is urged toward the open position by the return spring, so that the plate vanes are held in the open position, the open position causing the slide link to come into contact with the upper stopper. On the other hand, when the electric motor is rotated by power supply thereto, the slide link is moved to the closed position against the return spring by the arm link which rotates integrally with the electric motor, so that the plate vanes are rotated up to the closed position, the closed position causing the slide link to come into contact with the lower stopper.

A failure of the shutter is detected by detecting an induced voltage of the electric motor when the slide link is moved from the closed position to the open position by the return spring after power supply to the electric motor is stopped.

According to JP-A No. 2010-247819, abnormality of the movable fins is detected based on whether or not the operating time from the start of energization of the electric motor until detection of a lock current value is within a reference time range. The operating time is detected by contact of the prevention unit with one of the multiple interlocking movable fins. Thus, even if a movable fin other than the movable fin in contact with the prevention unit falls off, or a unit for interlocking the movable fins has a failure, the operation is normal may be erroneously determined to be normal. In addition, since the prevention unit, which projects from the case frame, receives a heavy load due to contact with the movable fins at the open position, rigidity for preventing deformation of the case frame is necessary, and thus the shape of the case frame is limited.

In JP-A No. 2012-25175, the plate vanes rotatably attached to the multiple shafts are connected to the slide link, and a failure of the shutter is detected by detecting an induced voltage of the electric motor which is caused by a movement of the slide link. Thus, even if an operation of the plate vanes has a failure, for example, a plate vane falls off, or a joint connecting the slide link and the plate vanes falls off, erroneous determination indicating that the operation may erroneously be determined to be normal.

SUMMARY OF THE INVENTION

The present invention has been devised in view of the above-mentioned circumstances. It is an object of the invention to provide a variable duct apparatus for a vehicle which is capable of properly determining an abnormal condition.

A first aspect of the invention provides a variable duct apparatus for a vehicle including: a first louver and a second louver that are disposed at a front of a vehicle and configured to rotate respectively around a first axis and a second axis up to an open position and a closed position, the first axis and the second axis extending in the vehicle width direction, the open position allowing air to be introduced into the vehicle front, the closed position causing the introduction of air to be blocked or reduced; a link to connect the first louver and the second louver in an interlocking manner; a first stopper and a second stopper that are respectively disposed at the first louver and the second louver and configured to come into contact with each other to control the first louver and the second louver at the open position; an electric motor to rotationally drive the first louver; and a control device to perform an opening operation for rotating the first louver up to the open position and a closing operation for rotating the first louver up to the closed position by supplying current to the electric motor until a lock current value is detected. The control device includes an abnormality determining unit to determine that an operating state is abnormal when an operating angle of the first louver from a start of either one of the opening operation and the closing operation until the detection of the lock current value is out of a predetermined reference operating angle range.

The reference operating angle range may be a range of the operating angle of the first louver from the start of the opening operation until the first stopper and the second stopper come into contact with each other.

The operating angle may a rotation angle of the electric motor during the opening operation, and the reference operating angle range may be a range of the rotation angle of the electric motor during the opening operation from the start of the opening operation until the first stopper and the second stopper come into contact with each other.

DETAILED DESCRIPTION

Hereinafter, a variable duct apparatus for a vehicle according to an implementation will be described with reference to FIGS. 1 to 8.

Figure 1:
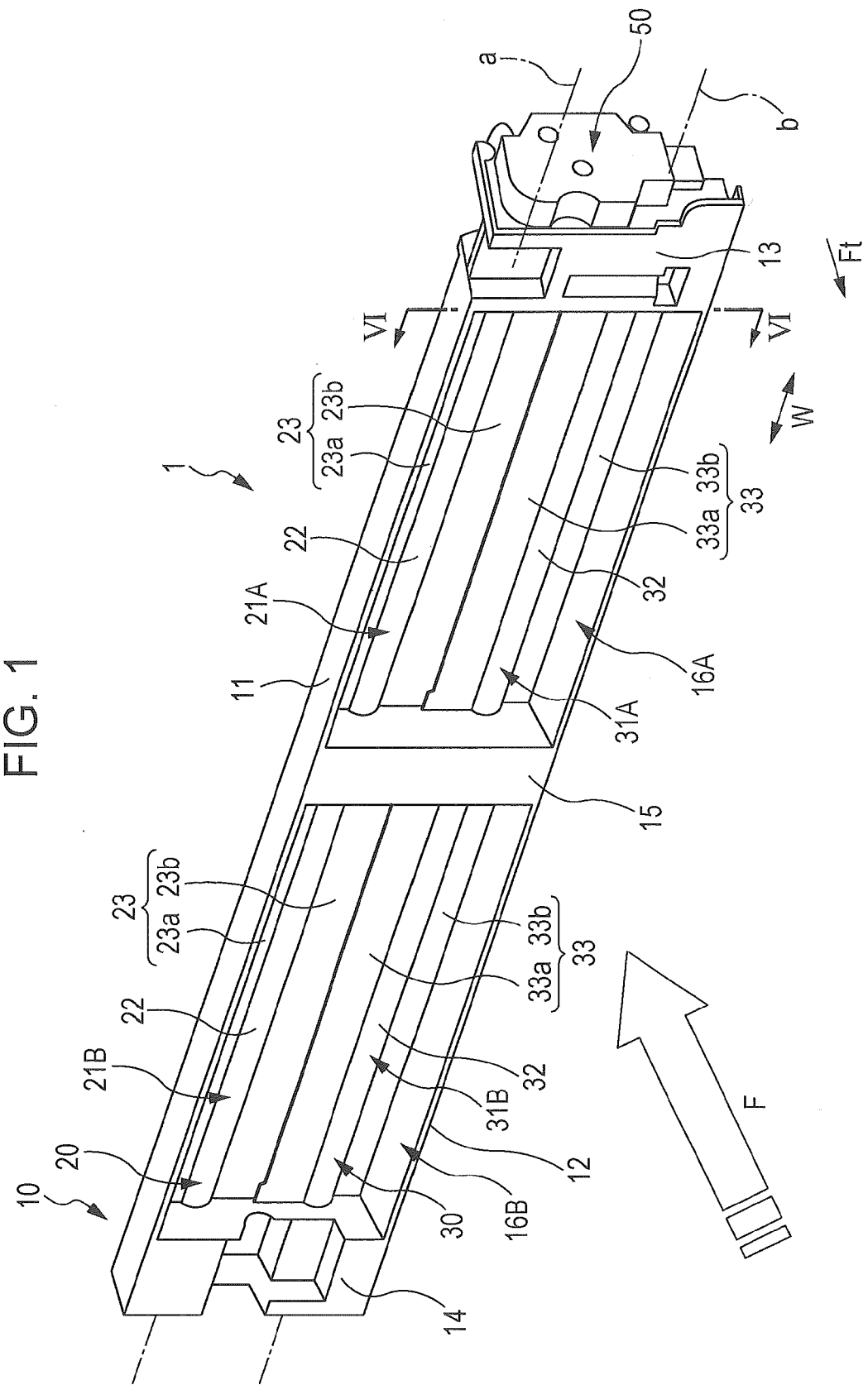
FIG. 1 is an upper front perspective view of a variable duct apparatus in a fully closed state according to an implementation.
Figure 2:
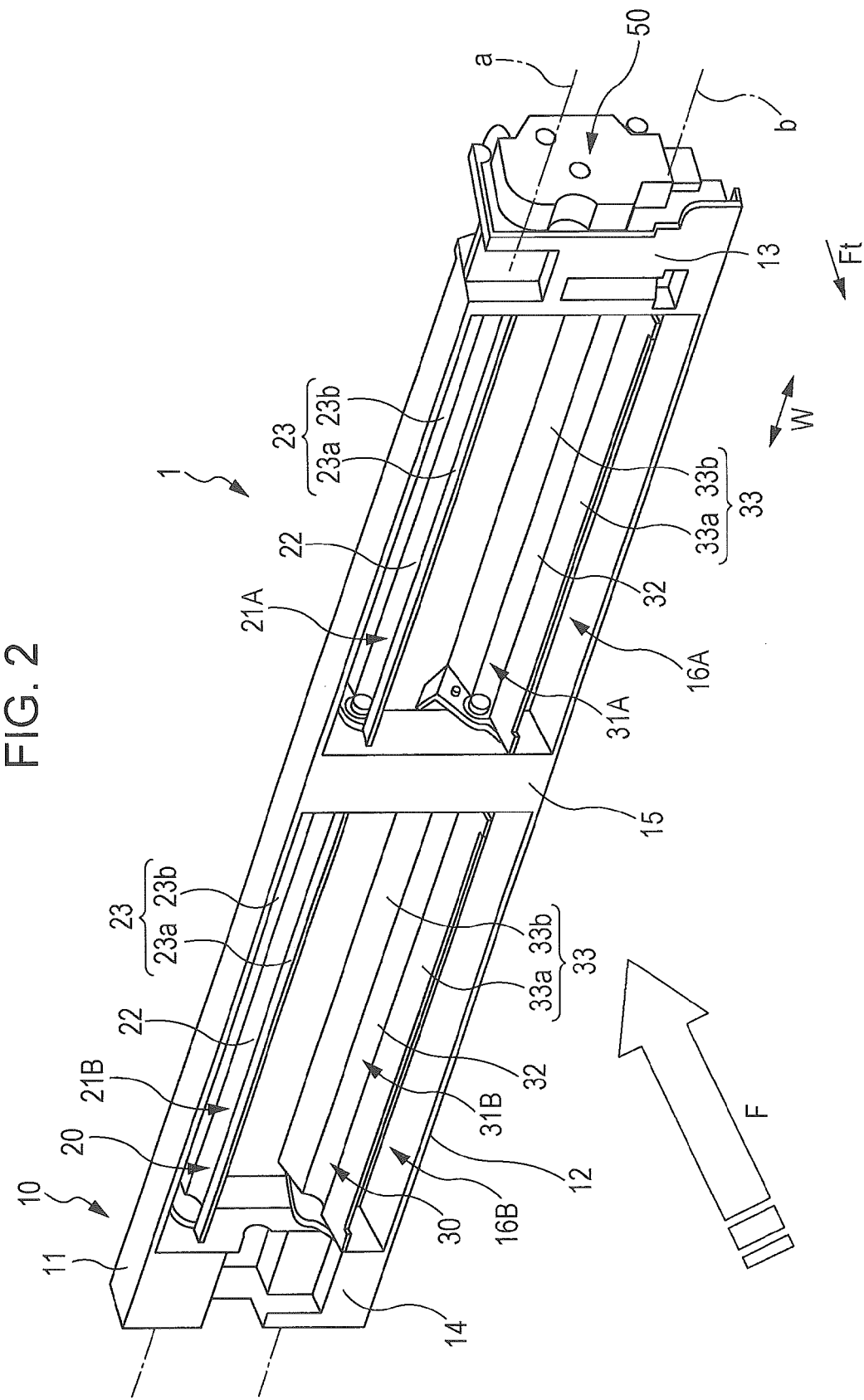
FIG. 2 is an upper front perspective view of the variable duct apparatus in a fully open state.
Figure 3:
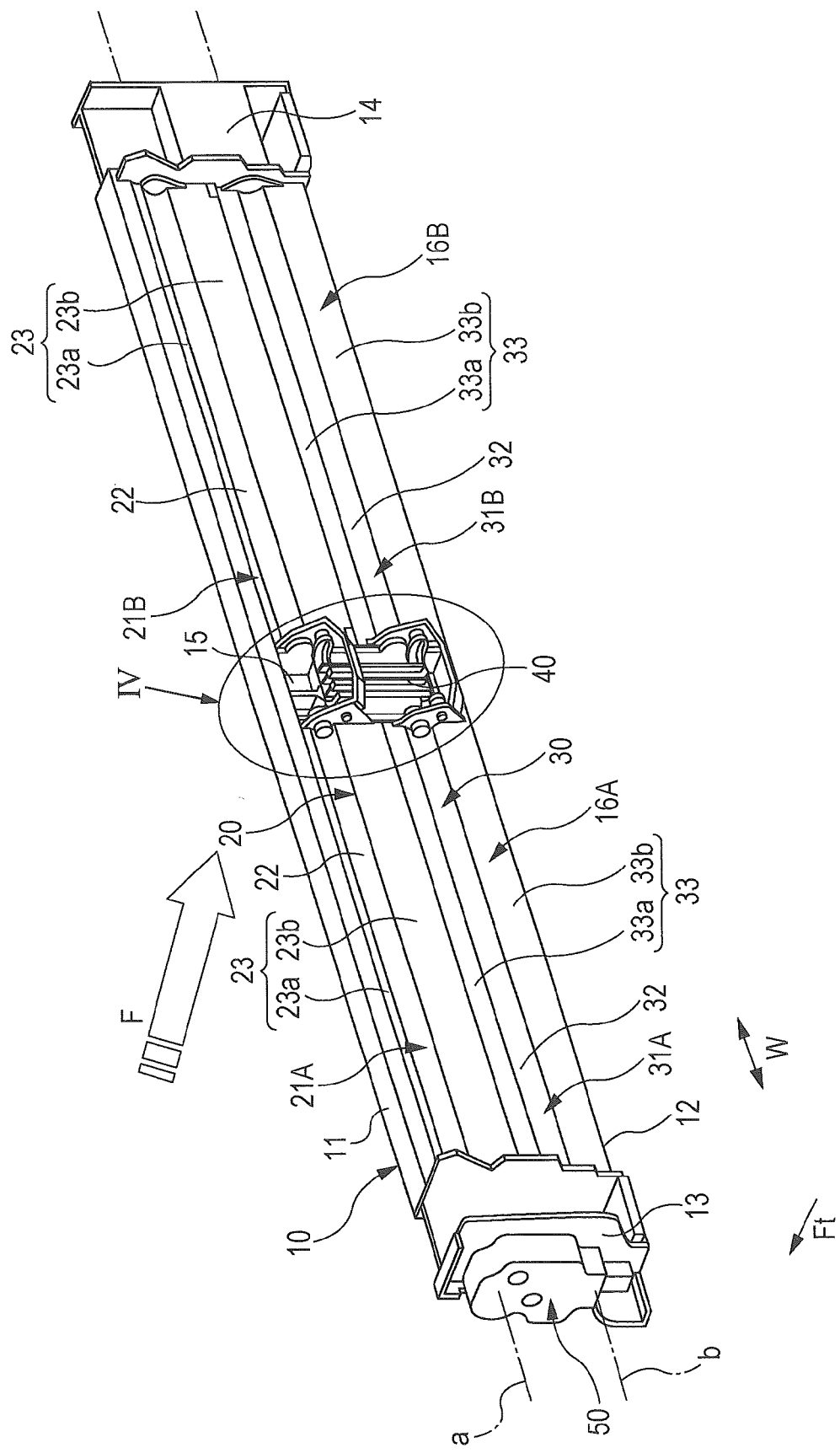
FIG. 3 is an upper rear perspective view of the variable duct apparatus in a fully closed state.
Figure 4:
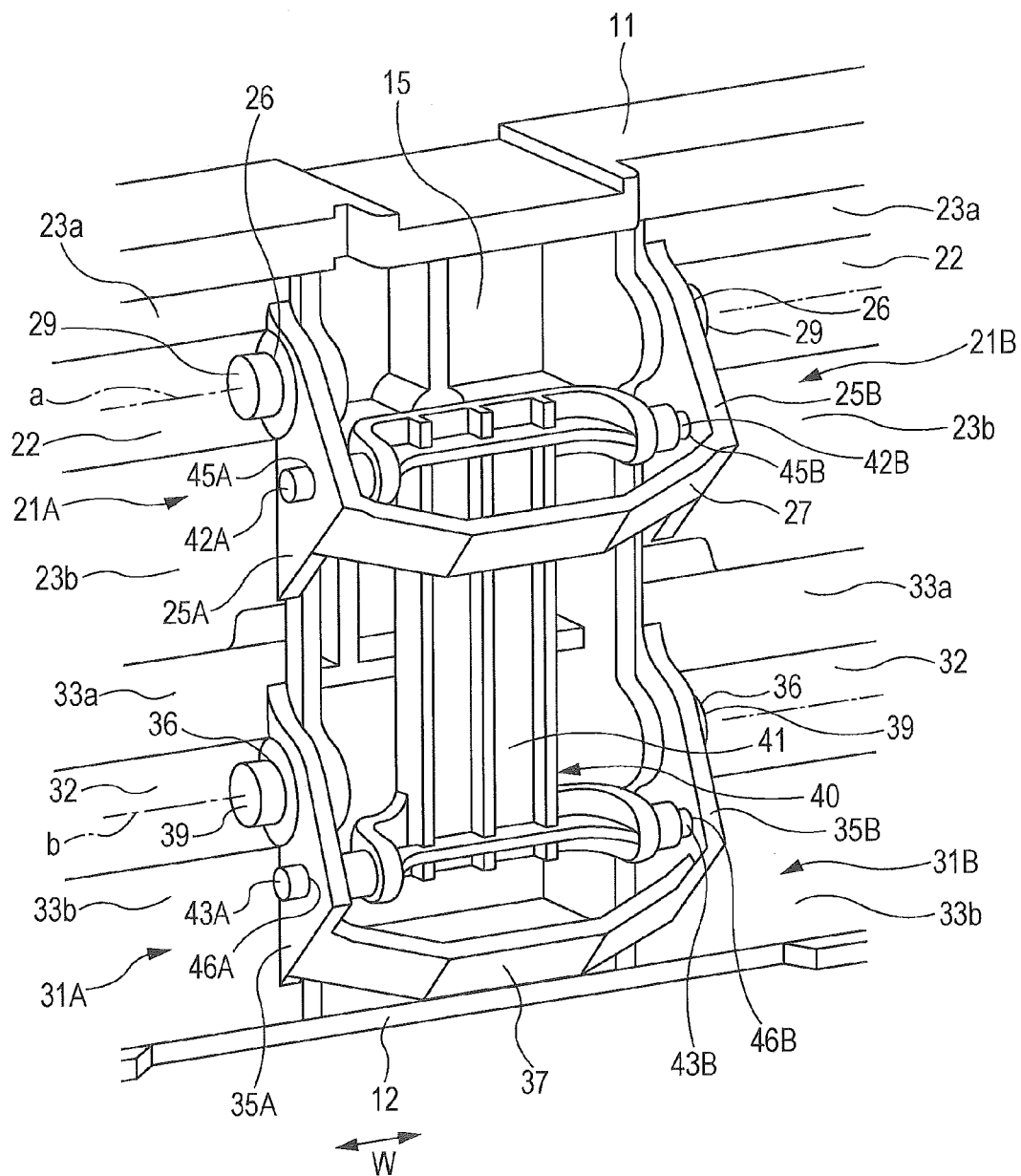
FIG. 4 is an enlarged view of portion IV of FIG. 3.
Figure 5:
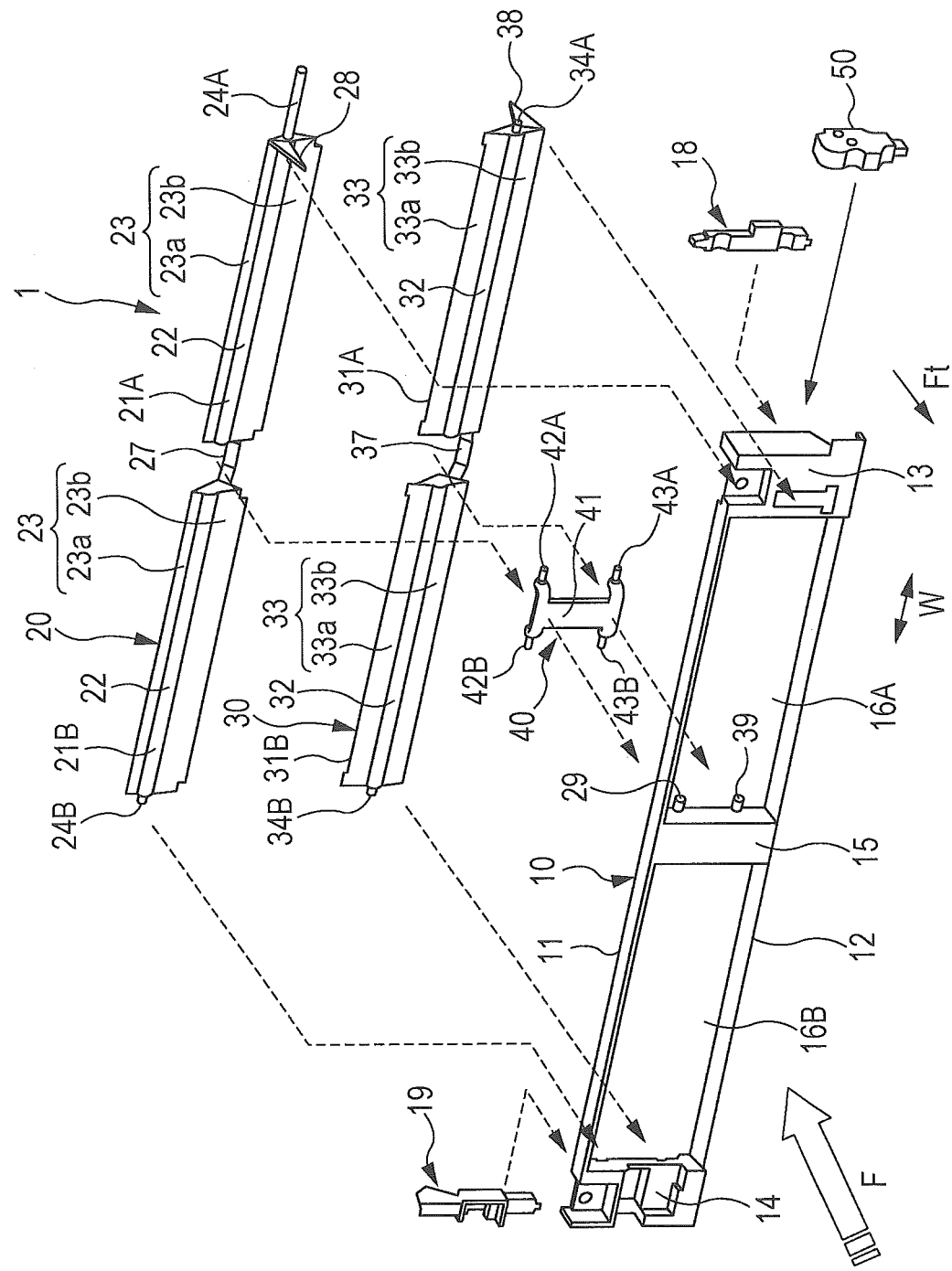
FIG. 5 is an exploded perspective view of the variable duct apparatus.
Figure 6:
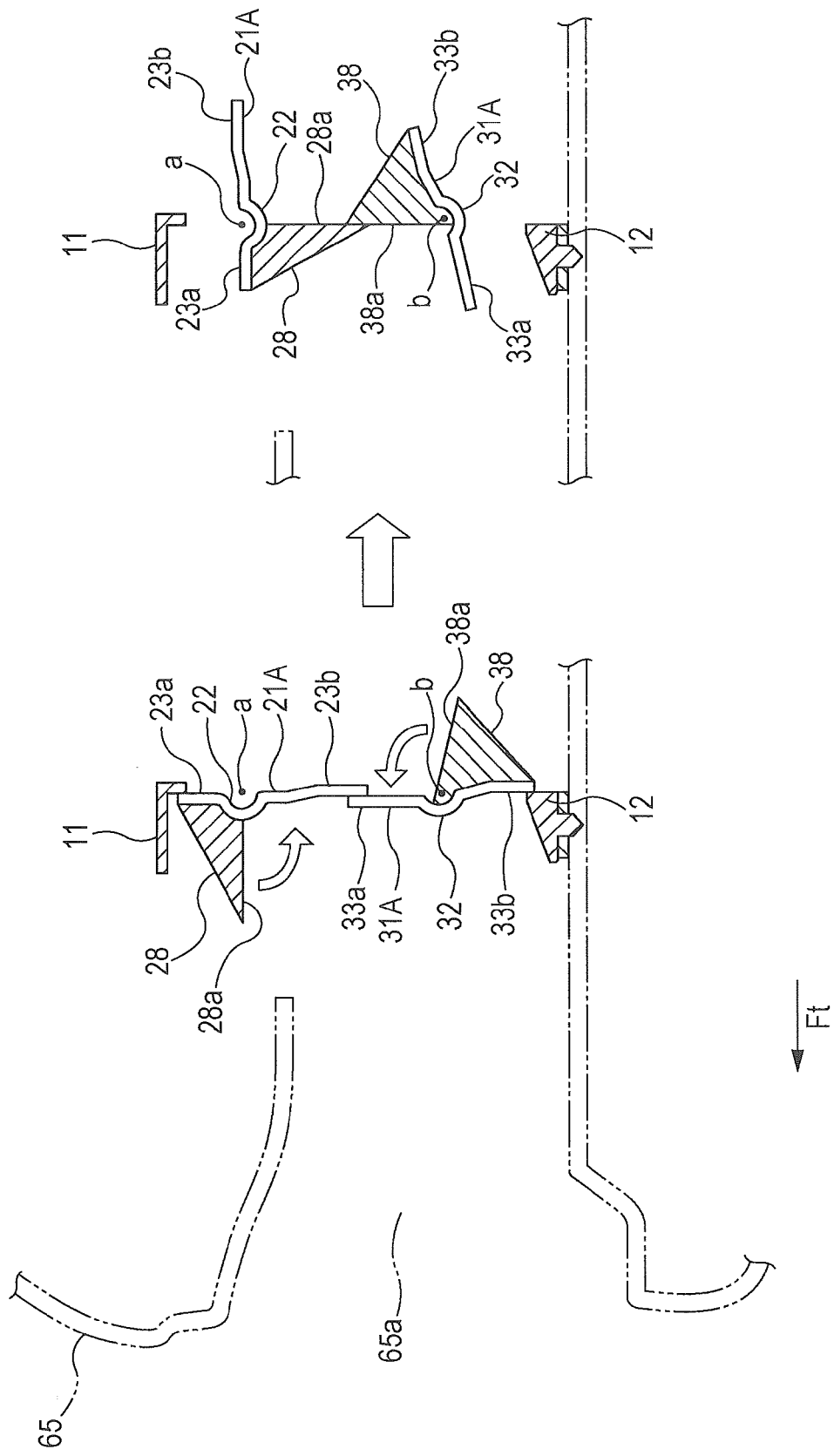
FIG. 6A is a cross-sectional view of the variable duct apparatus taken along line VI-VI in a fully closed state.
FIG. 6B is a cross-sectional view of the variable duct apparatus taken along line VI-VI in a fully open state.
Figure 7:
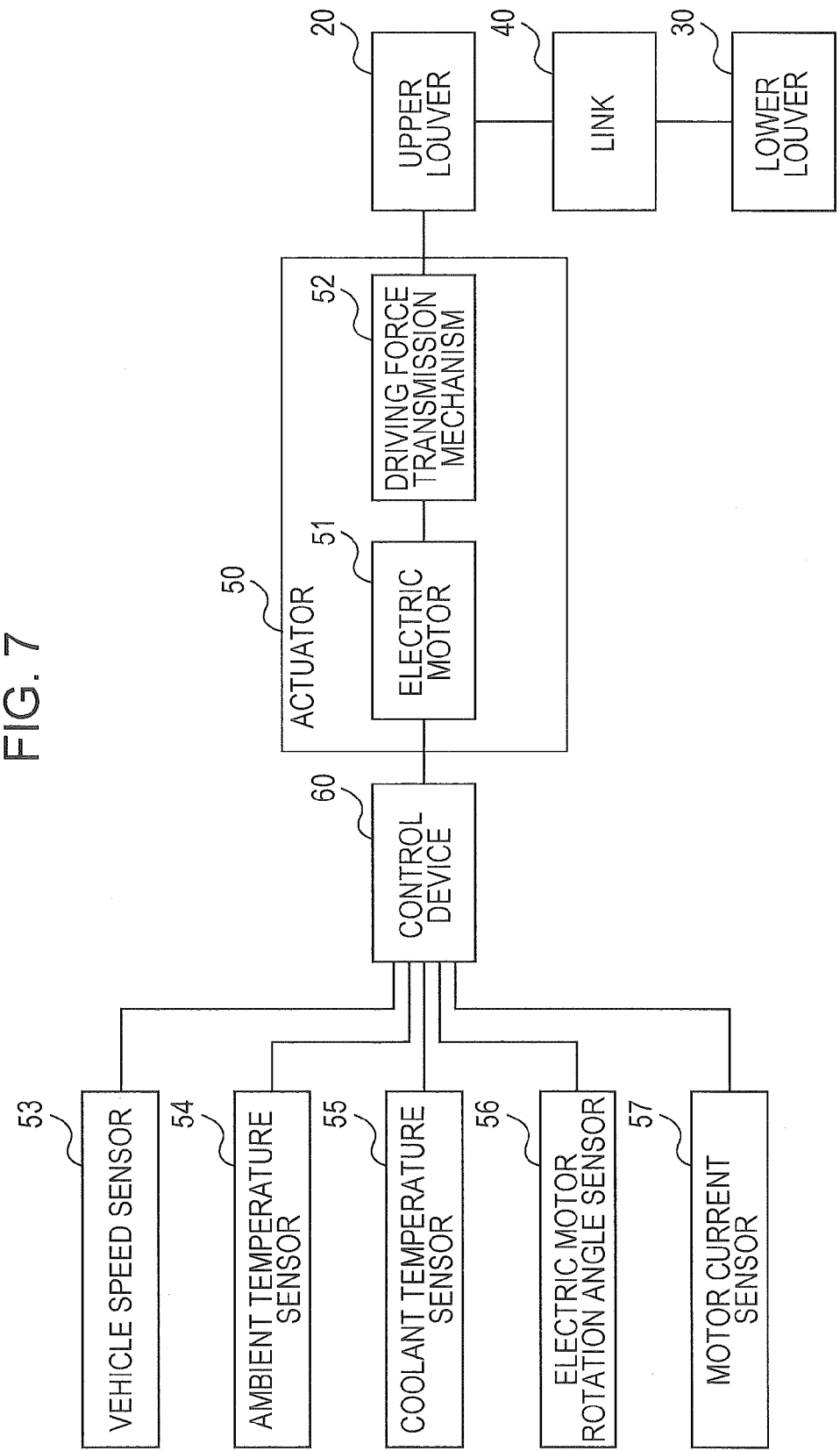
FIG. 7 is a block diagram illustrating the control system of the variable duct apparatus.

FIG. 1 is an upper front perspective view of a variable duct apparatus 1 in a fully closed state according to an implementation; FIG. 2 is an upper front perspective view of the variable duct apparatus 1 in a fully open state; FIG. 3 is an upper rear perspective view of the variable duct apparatus 1 in a fully closed state; FIG. 4 is an enlarged view of portion IV of FIG. 3; and FIG. 5 is an exploded perspective view of the variable duct apparatus 1. FIG. 6A is a cross-sectional view of the variable duct apparatus 1 taken along line VI-VI in a fully closed state; and FIG. 6B is a cross-sectional view of the variable duct apparatus 1 taken along line VI-VI in a fully open state. FIG. 7 is a block diagram illustrating the control system of the variable duct apparatus 1. In the figures, arrow Ft indicates the direction to the front of the vehicle, arrow W indicates the width direction of the vehicle, and arrow F indicates the direction in which air is introduced. In FIGS. 6A and 6B, part of a bumper 65 is illustrated by an imaginary line.

The variable duct apparatus 1 in the present implementation is disposed on a passage of air which flows through an air grille 65a at a lower portion the bumper 65 and forward of a radiator disposed at the front of the vehicle. The variable duct apparatus 1 moves a upper louver 20 serving as the first louver and a lower louver 30 serving as the second louver up to a closed position or an open position, thereby allowing or prohibiting air flown through the air grille 65a in the bumper 65 to be introduced to the front of the vehicle. The upper louver 20 and the lower louver 30 will be described in detail later.

The variable duct apparatus 1 includes a frame 10 in a rectangular enclosure frame shape, the upper louver 20, the lower louver 30, a link 40, and an actuator 50 for rotating the upper louver 20. The upper louver 20 and the lower louver 30 are disposed to be spaced vertically on the frame 10 via bearing devices 18 and 19. The link 40 connects the upper louver 20 and the lower louver 30 in an interlocking manner.

The frame 10 is made of resin and formed in a rectangular enclosure frame shape as illustrated in FIGS. 1 and 5. The rectangular enclosure frame shape having a longer dimension in the vehicle width direction. The frame 10 includes an upper frame 11 and a lower frame 12 which face each other and extend in the vehicle width direction, and side frames 13 and 14 which respectively connect the left and right ends of the upper frame 11 and the lower frame 12. A center frame 15 runs between the upper frame 11 and the lower frame 12 in the center of the vehicle width so as to partition the frame 10 into a first air flow passage 16A and a second air flow passage 16B on the left and right.

The side frames 13 and 14 on the left and right of the frame 10 are respectively provided with the bearing devices 18 and 19 by which the upper louver 20 and the lower louver 30 are disposed to be respectively rotatable around an upper axis a serving as the first axis and a lower axis b serving as the second axis. Both axes a and b extend in parallel to the vehicle width direction.

The upper louver 20 is made of resin and has a rectangular first upper louver 21A and a rectangular second upper louver 21B each having a longer dimension in the vehicle width direction. The upper louver 20 is set in a closed position or in an open position by rotation of the first upper louver 21A and the second upper louver 21B. The closed position causes the upper range of the first air flow passage 16A and the second air flow passage 16B to be closed by the first upper louver 21A and the second upper louver 21B, respectively as illustrated in FIG. 1. The open position causes the upper range of the first air flow passage 16A and the second air flow passage 16B to be opened by the first upper louver 21A and the second upper louver 21B, respectively as illustrated in FIG. 2.

The first upper louver 21A has at its center an arc-shaped cross-sectional shaft 22, a rectangular plate-shaped upper fin 23a, and a rectangular plate-shaped lower fin 23b. The shaft 22 extends in the vehicle width direction along the upper axis a. The upper fin 23a extends along and above the shaft 22. The lower fin 23b extends along and below the shaft 22. The upper fin 23a and the lower fin 23b constitute a movable fin 23. A shaft 24A projects from the outside end of the first upper louver 21A in the direction of the upper axis a. As illustrated in FIG. 4, a flange 25A is formed in a bent shape at the inside end of the first upper louver 21A. In the flange 25A, an axial hole 26 is formed coaxially with the upper axis a, and a link locking hole 45A is formed rearwardly of the axial hole 26 with an offset.

The second upper louver 21B is substantially symmetrical with the first upper louver 21A, and has the shaft 22 extending along the upper axis a. The upper fin 23a and the lower fin 23b extend above and below the shaft 22. A shaft 24B projects from the outside end of the second upper louver 21B in the direction of the upper axis a. As illustrated in FIG. 4, a flange 25B is formed in a bent shape at the inside end of the second upper louver 21B. In the flange 25B, the axial hole 26 is formed coaxially with the upper axis a, and a link locking hole 45B is formed rearwardly of the axial hole 26 with an offset.

The flange 25A of the first upper louver 21A and the flange 258 of the second upper louver 21B constructed in this manner are connected to each other by a connecting component 27 and integrally formed. As illustrated in FIGS. 5 and 6, an approximately triangular first stopper 28 having a contact surface 28a is projects forwardly from the outside end of the upper fin 23a of the first upper louver 21A.

In the upper louver 20 formed in the above manner, the shaft 24A is rotatably supported by the side frame 13 via the bearing device 18; the shaft 24B is rotatably supported by the side frame 14 via the bearing device 19; and the axial hole 26 formed in each of the flanges 25A and 25B is supported on the center frame 15 by a shaft portion 29. Thus, the upper louver 20 is mounted on the frame 10 so as to be rotatable around the upper axis a. In addition, the first stopper 28 is formed at the outer end of the first upper louver 21A. The outer end is located in the vicinity of the shaft 24A which is supported by the side frame 13.

The lower louver 30 is made of resin and has a rectangular first lower louver 31A and a rectangular second lower louver 31B each having a longer dimension in the vehicle width direction. The lower louver 30 is be set in a closed position or in an open position by rotation of the first lower louver 31A and the second lower louver 31B. The closed position causes the lower range of the first air flow passage 16A and the second air flow passage 16B to be closed by the first lower louver 31A and the second lower louver 31B, respectively as illustrated in FIG. 1. The open position causes the lower range of the first air flow passage 16A and the second air flow passage 16B to be opened by the first lower louver 31A and the second lower louver 31B, respectively as illustrated in FIG. 2.

The first lower louver 31A has a shaft 32, a rectangular plate-shaped upper fin 33a, and a rectangular plate-shaped lower fin 33b. The shaft 32 extends in the vehicle width direction along the lower axis b. The upper fin 33a extends along and above the shaft 32. The lower fin 33b extends along and below the shaft 32. The upper fin 33a and the lower fin 33b constitute a movable fin 33. A shaft 34A projects from the outside end of the first lower louver 31A in the direction of the lower axis b. In a flange 35A formed in a bent shape at the inside end of the first lower louver 31A, an axial hole 36 is formed coaxially with the lower axis b, and a link locking hole 46A is formed rearwardly of the axial hole 36 with an offset.

The second lower louver 31B is substantially symmetrical with the first lower louver 31A, and has the shaft 32 extending along the lower axis b. The upper fin 33a and the lower fin 33b extend above and below the shaft 32. A shaft 34B projects from the outside end of the second lower louver 31B in the direction of the lower axis b. A flange 355 is formed at the inside end of the second lower louver 31B. In the flange 35B, the axial hole 36 is formed coaxially with the lower axis b, and a link locking hole 46B is formed rearwardly of the axial hole 36 with an offset.

The flange 35A of the first lower louver 31A and the flange 35B of the second lower louver 31B constructed in this manner are connected to each other by a connecting component 37. As illustrated in FIGS. 5 and 6, an approximately triangular second stopper 38 is formed which has a contact surface 38a and projects rearwardly from the outside end of the lower fin 33b of the first lower louver 31A.

In the lower louver 30 formed in the above manner, the shaft 34A is rotatably supported by the side frame 13 via the bearing device 18; the shaft 34B is rotatably supported by the side frame 14 via the bearing device 19; and the axial hole 36 formed in each of the flanges 35A, 35B is supported on the center frame 15 via a shaft portion 39 as illustrated in FIG. 4.

The link 40 for connecting the upper louver 20 and the lower louver 30 in an interlocking manner has a rectangular plate-shaped base 41 having a longer dimension in the vertical direction, and upper shafts 42A and 42B are formed at both lateral upper ends of the base 41. In addition, lower shafts 43A and 43B are formed at both lateral lower ends of the base 41.

The upper shafts 42A and 42B are inserted through the link locking holes 45A and 45B of the opposing flanges 25A and 25B of the upper louver 20, respectively, and the lower shafts 43A and 43B are inserted through the link locking holes 46A and 46B of the opposing flanges 35A and 35B of the lower louver 30, respectively, whereby the upper louver 20 and the lower louver 30 are connected to each other in an interlocking manner by a linkage mechanism.

The shaft 24A of the upper louver 20 is connected via a driving force transmission mechanism 52 to the actuator 50 having an electric motor 51. The driving force of the electric motor 51 rotates the shaft 24A via the driving force transmission mechanism 52, thereby rotating the upper louver 20 around the upper axis a. The rotation of the upper louver 20 causes rotation of the lower louver 30 around the lower axis b via the link 40 in an interlocking manner.

In the closed position of the upper louver 20, as illustrated in FIG. 6A, the end of the upper fin 23a of the first upper louver 21A is in contact with the upper frame 11, so that rotation is stopped, and the upper range of the first air passage 16A is closed by the first upper louver 21A. Similarly, the end of the upper fin 23a of the second upper louver 21B is in contact with the upper frame 11, thus the upper range of the second air passage 16B is closed by the second upper louver 21B.

In the closed position of the lower louver 30, as illustrated in FIG. 6A, the end of the lower fin 33b of the first lower louver 31A is in contact with the lower frame 12, so that rotation is stopped, the end of the upper fin 33a is in contact with the end of the lower fin 23b of the first upper louver 21A so as to close the lower range of the first air passage 16A, and thus the first air passage 16A is closed by the first upper louver 21A and the first lower louver 31A. Similarly, the lower fin 33b of the second lower louver 31B is in contact with the lower frame 12, so that rotation is stopped, the end of the upper fin 33a is in contact with the end of the lower fin 23b of the second upper louver 21B so as to close the lower range of the second air passage 16B, and thus the second air passage 16B is closed by the second upper louver 21B and the second the lower louver 31B.

On the other hand, in the open position of the upper louver 20, as illustrated in FIG. 6B, the upper range of the first air passage 16A is open at a horizontal rotation position at which the end of the upper fin 23a of the first upper louver 21A is away from the upper frame 11. In the open position of the lower louver 30, as illustrated in FIG. 6B, the lower range of the first air passage 16A is open at a horizontal rotation position at which the end of the lower fin 33b of the first lower louver 31A is away from the lower frame 12, and the contact surface 28a of the first stopper 28 formed in the first upper louver 21A is in contact with the contact surface 38a of the second stopper 38 formed in the first lower louver 31A, so that the upper louver 20 and the lower louver 30 are controlled at the open position. In fully open state, the upper louver 20 and the lower louver 30 are controlled at the open position by contacting the first stopper 28 with the second stopper 38, thereby reducing the load to the frame 10.

Similarly, the upper range of the second air passage 16B is opened at a horizontal rotation position at which the end of the upper fin 23a of the second upper louver 21B is away from the upper frame 11, and the lower range of the second air passage 16B is opened at a horizontal rotation position at which the end of the lower fin 33b of the second the lower louver 31B is away from the lower frame 12.

The amount of air introduced through the air grille 65a of the bumper 65 into the front of a running vehicle can be adjusted by rotating the upper louver 20 and the lower louver 30 in the variable duct apparatus 1 up to one of two positions, that is, the closed position and the open position.

For example, when the vehicle speed is above a predetermined speed and the temperature of the coolant is lower below a predetermined temperature, the upper louver 20 and the lower louver 30 are set in the closed position, whereby flow of the air into the front of the vehicle is blocked or reduced, and the amount of air which flows into the front of the vehicle is reduced and the air resistance is decreased. When the temperature of coolant is above a certain value, the upper louver 20 and the lower louver 30 are switched to the open position, and thus an increase in temperature of the coolant can be inhibited even when the vehicle runs at a high speed.

When the temperature of the engine coolant is below a predetermined temperature, the upper louver 20 and the lower louver 30 are set in the closed position, whereby flow of the air into the front of the vehicle is blocked or reduced, for example, during low speed driving or warm-up driving in the winter or in a cold region, and thus excessive cooling of the engine is prevented and warm-up performance of the engine and the catalytic activity of an exhaust gas purifier device can be promoted.

As illustrated by the block diagram in FIG. 7, the variable duct apparatus 1 includes the actuator 50 having the electric motor 51 and the driving force transmission mechanism 52 interposed between the electric motor 51 and the shaft 24A of the upper louver 20, a vehicle speed sensor 53 for detecting a vehicle speed, an ambient temperature sensor 54, a coolant temperature sensor 55 for detecting a temperature of engine coolant, an electric motor rotation angle sensor 56 for detecting a rotation angle of the electric motor 51, a motor current sensor 57 for detecting a lock current value occurred in the electric motor 51, and a control device 60 for controlling the electric motor 51.

The control device 60 receives detection signals from the vehicle speed sensor 53, the ambient temperature sensor 54, the coolant temperature sensor 55, the electric motor rotation angle sensor 56, and the motor current sensor 57. It is determined according to the detection signals whether opening operation conditions for setting the upper louver 20 and the lower louver 30 in the open position, or closing operation conditions for setting the upper louver 20 and the lower louver 30 in the closed position are satisfied. For example, when the vehicle speed detected by the vehicle speed sensor 53 is high and the coolant temperature detected by the coolant temperature sensor 55 is low, a closing operation is performed in order to improve driving stability. When the coolant temperature detected by the coolant temperature sensor 55 is high, an opening operation is performed in order to effectively cool the coolant.

When the control device 60 determines that an opening or closing operation should be performed, current is supplied to the electric motor 51, the upper louver 20 is rotated via the driving force transmission mechanism 52 by the electric motor 51, and the lower louver 30 is rotated via the link 40 in an interlocking manner. When the motor current sensor 57 detects a lock current value of the electric motor 51, the supply of current is stopped, and the rotation of the upper louver 20 and the lower louver 30 is stopped.

For example, when the control device 60 determines that an opening operation should be performed in a state where the upper louver 20 and the lower louver 30 are in the closed positions as illustrated in FIG. 1 and FIG. 6A, current is supplied to the electric motor 51, and the driving force transmission mechanism 52 of the upper louver 20 to operate from the closed position to the open position, and the lower louver 30 is interlocked with the upper louver 20 via the link 40 so as to operate from the closed position to the open position. When the upper louver 20 and the lower louver 30 are rotated to the open position, the contact surface 28a of the first stopper 28 of the upper louver 20 comes into contact with the contact surface 38a of the second stopper 38 of the lower louver 30 as illustrated in FIG. 6B, so that rotation of the upper louver 20 and the lower louver 30 is restricted. When the motor current sensor 57 detects a lock current value of the electric motor 51 which is caused by the rotation restriction of the upper louver 20, current supply to the electric motor 51 is stopped and the upper louver 20 and the lower louver 30 are held in the open position.

On the other hand, when the control device 60 determines that a closing operation should be performed in a state where the upper louver 20 and the lower louver 30 are in the open position, current is supplied to the electric motor 51 to rotate the electric motor 51, and the driving force transmission mechanism 52 causes the upper louver 20 to operate from the open position to the closed position, and the lower louver 30 is interlocked with the upper louver 20 via the link 40 causes so as to be operate from the open position to the closed position.

When the upper louver 20 and the lower louver 30 operate to the closed position, the end of the upper fin 23a of the upper louver 20 comes into contact with the upper frame 11 and the end of the lower fin 33b of the lower louver 30 comes into contact with the lower frame 12 as illustrated in FIG. 6A, so that rotation of the upper louver 20 and the lower louver 30 is controlled. When the motor current sensor 57 detects the lock current value of the electric motor 51 which is caused by the above rotation restriction of the upper louver 20, current supply to the electric motor 51 is stopped and the upper louver 20 and the lower louver 30 are held in the closed position.

Figure 8:
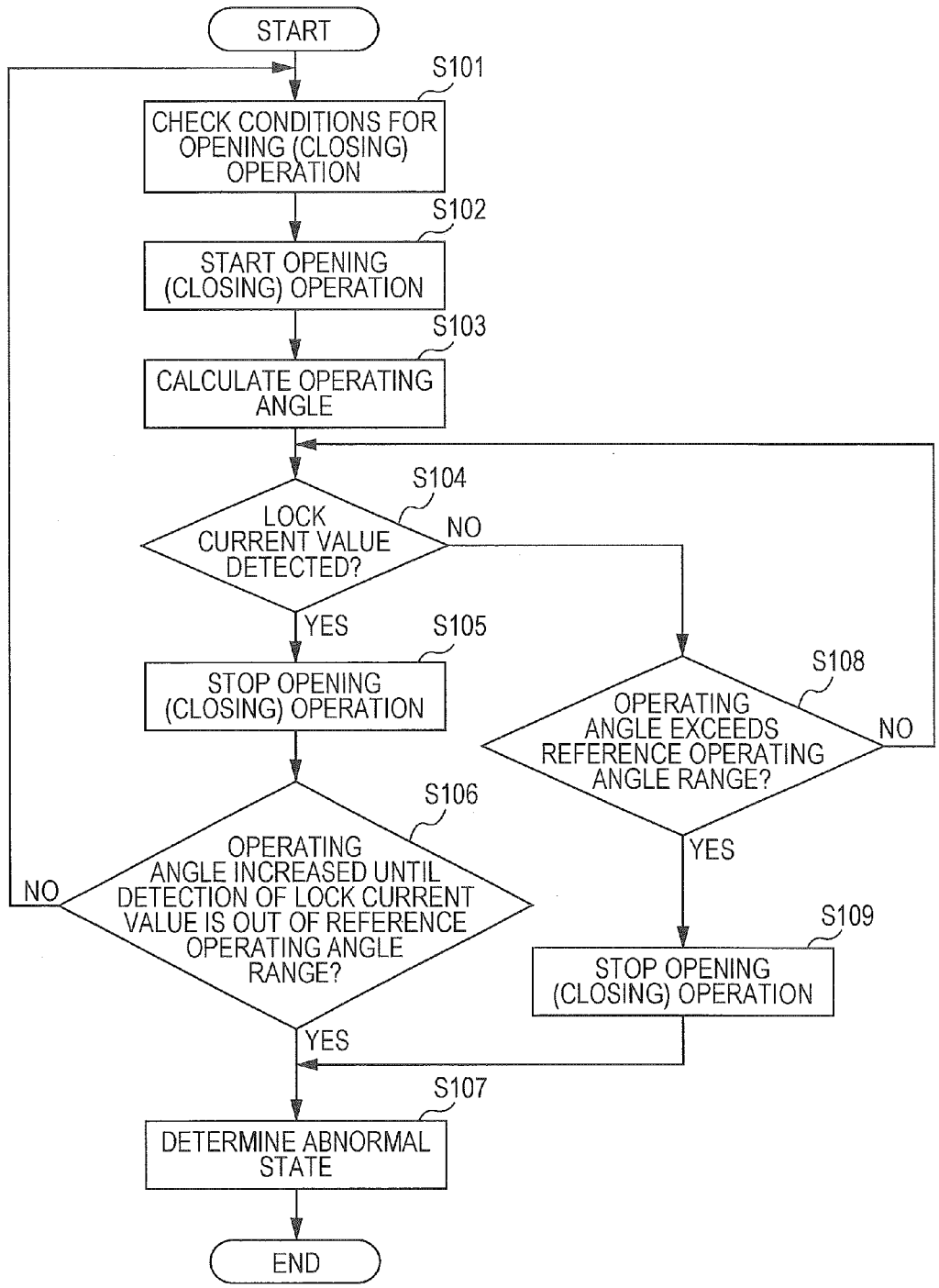
FIG. 8 is a flow chart illustrating an abnormality determining unit of the variable duct apparatus.

The flow of the abnormality determination processing performed by the abnormality determining unit included in the control device 60 will be described with reference to the flow chart of FIG. 8.

The control device 60 is provided in advance with a reference operating angle range as the operating angle when the upper louver 20 is operated to rotate from the closed position to the open position. The reference operating angle range is the number of rotations for the rotation angle of the electric motor 51 necessary for an opening operation until the first stopper 28 and the second stopper 38 come into contact with each other as the upper louver 20 is operated to rotate from the closed position to the open position.

While running, the control device 60 reads detection values from the vehicle speed sensor 53, the ambient temperature sensor 54, the cooling coolant temperature sensor 55, etc., and it is determined according to the detection values whether operation conditions for the upper louver 20 and the lower louver 30 are satisfied (step S101). According to the result, the control device 60 supplies current to the electric motor 51 to start the opening operation or the closing operation (step S102).

For the sake of clarity of description, step S103 and subsequent steps will be described for the case where the opening operation conditions are satisfied in step S101 and the closing operation conditions are satisfied in step S102. The flow chart of FIG. 8 with selection of the operation described in each parenthesis provides the flow of abnormality determination and verification operation when the closing operation conditions are satisfied in step S101.

When the electric motor 51 is driven to start the opening operation of the upper louver 20 and the lower louver 30 (step 102), the operating angle of the upper louver 20 is calculated based on the number of revolutions accompanied by the opening operation of the electric motor 51 (step S103). Then it is checked as needed whether or not the lock current value has been detected (step S104).

When a lock current value has not been detected, current is continued to be supplied to the electric motor 51 until a lock current value is detected (NO in step S104). When a lock current value is detected (YES in step S104), the supply of current to the electric motor 51 is stopped, and the opening operation of the upper louver 20 is stopped (step S105). Then it is determined whether or not the operating angle until detection of the above-mentioned lock current value is out a predetermined reference operating angle range (step S106).

When the operating angle until detection of a lock current value is within the reference operating angle range (No in step S106), that is, when it is determined that the opening operation has been performed without any abnormality from the closed position to the open position where the first stopper 28 of the upper louver 20 is in contact with the second stopper 38 of the lower louver 30, normal operation control is continued subsequently while checking operation conditions as needed (steps S101 to S106).

When the operating angle until detection of a lock current value is out of the reference operating angle range (YES in step S106), an abnormal operating state is determined (step S107).

That is, when the operating angle until a lock current value is detected does not reach the reference operating angle range, it may be presumed that some abnormality, for example, fixation occurs in the upper louver 20, the lower louver 30, or the link 40 due to intrusion of foreign substances before the upper louver 20 reaches the open position, or fixation occurs in the driving force transmission mechanism 52 and a lock current value is detected during an opening operation, and thus the electric motor 51 stopped.

When the operating angle until a lock current value is detected exceeds the reference operating angle range, the closing operation stops because the upper louver 20 comes into contact with the upper frame 11 with the operating angle exceeding the reference operating angle range without any contact between the first stopper 28 of the upper louver 20 and the second stopper 38 of the lower louver 30, and thus a lock current value is detected. Accordingly, it may be presumed that abnormality occurs, for example, the lower louver 30 falls off where the first stopper 28 and the second stopper 38 are not in contact with each other within the reference operating angle range, or the link 40 for connecting between the upper louver 20 and the lower louver 30 falls off, or the link 40 is damaged.

On the other hand, when NO in step S104, that is, a lock current value is not detected, it is determined in step S108 whether or not the operating angle exceeds the reference operating angle range. When the operating angle exceeds the reference operating angle range, it may be presumed that in step S108, abnormality has occurred in which a lock current value remains to be undetected even when the operating angle exceeds the reference operating angle range, for example, the link 40 for connecting between the upper louver 20 and the lower louver 30 has fallen off or has been damaged, the lower louver 30 has fallen off, the upper louver 20 has fallen off, or abnormality has occurred in the driving force transmission mechanism 52.

As described above, the configuration according to the present implementation includes the open position, the closed position, and the link 40 which connects between the rotatable upper louver 20 and lower louver 30 in an interlocking manner. Further, the upper louver 20 and the lower louver 30 are controlled at the open position by contact between the first stopper 28 formed in the upper louver 20 and the second stopper 38 formed in the lower louver 30. As a result, abnormal operations such as fall off of the link 40 and the lower louver 30 can be determined by whether or not the operating angle of the upper louver 20 from the start of opening or closing operation until detection of a lock current value is out of the reference operating angle range.

The present invention is not limited to the above-described implementation, and various changes may be made without departing from the scope of the invention. For example, the first stopper 28 and the second stopper 38 are formed in the first upper louver 21A and the first lower louver 31A, respectively in the above-described implementation. Alternatively, the first stopper 28 and the second stopper 38 may be formed in the second upper louver 21B and the second the lower louver 31B, respectively.

The variable duct apparatus 1 is disposed according to the arrangement of the air grille 65a of the bumper 65 in the above-described implementation. Alternatively, the variable duct apparatus 1 may be disposed at another location such as a rear position of the front grille.

The invention claimed is:

1. A variable duct apparatus for a vehicle, the variable duct apparatus comprising:
   a first louver and a second louver that are disposed at a front of a vehicle and configured to rotate respectively around a first axis and a second axis up to an open position and a closed position, the first axis and the second axis extending in the vehicle width direction, the open position allowing air to be introduced into the vehicle front, the closed position causing the introduction of air to be blocked or reduced;
   a link configured to connect the first louver and the second louver in an interlocking manner;
   a first stopper and a second stopper that are respectively disposed at the first louver and the second louver and configured come into contact with each other to control the first louver and the second louver at the open position;
   an electric motor to rotationally drive the first louver; and
   a control device to perform an opening operation for rotating the first louver up to the open position and a closing operation for rotating the first louver up to the closed position by supplying current to the electric motor until a lock current value is detected,
   wherein the control device includes an abnormality determining unit to determine that an operating state is abnormal when an operating angle of the first louver from a start of either one of the opening operation and the closing operation until the detection of the lock current value is out of a predetermined reference operating angle range.

2. The variable duct apparatus for a vehicle according to claim 1,
wherein the reference operating angle range is a range of the operating angle of the first louver from the start of the opening operation until the first stopper and the second stopper come into contact with each other.

3. The variable duct apparatus for a vehicle according to claim 2,
wherein the operating angle is a rotation angle of the electric motor during the opening operation, and the reference operating angle range is a range of the rotation angle of the electric motor during the opening operation from the start of the opening operation until the first stopper and the second stopper come into contact with each other.

4. The variable duct apparatus for a vehicle according to claim 1,
wherein the operating angle is a rotation angle of the electric motor during the opening operation, and the reference operating angle range is a range of the rotation angle of the electric motor during the opening operation from the start of the opening operation until the first stopper and the second stopper come into contact with each other.

\* \* \* \* \*